Oct. 19, 1965  D. D. ROBERTSON  3,213,340
MOTOR DRIVEN HERMETICALLY SEALED VARIABLE CAPACITOR
Filed Oct. 3, 1962  2 Sheets-Sheet 2
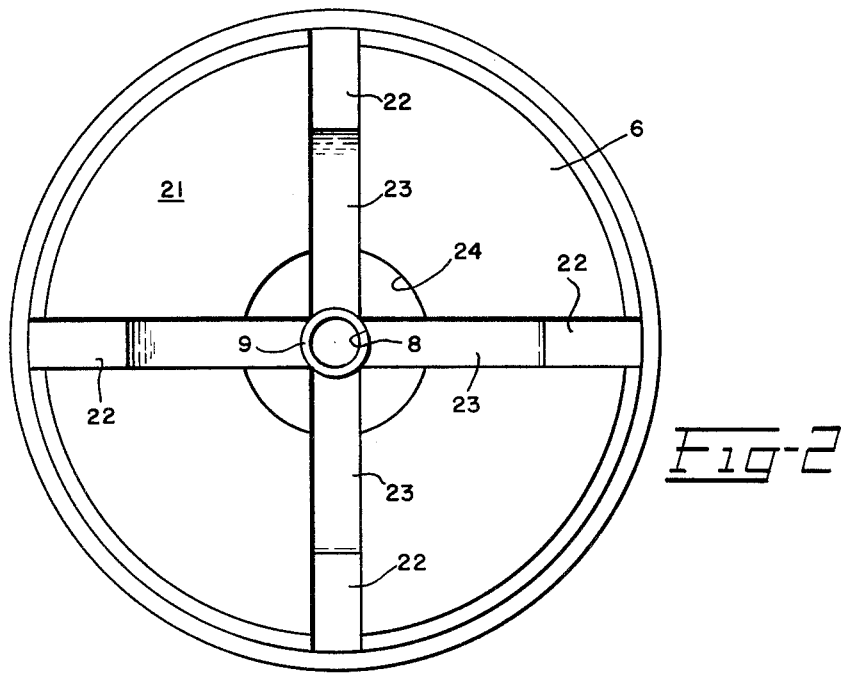
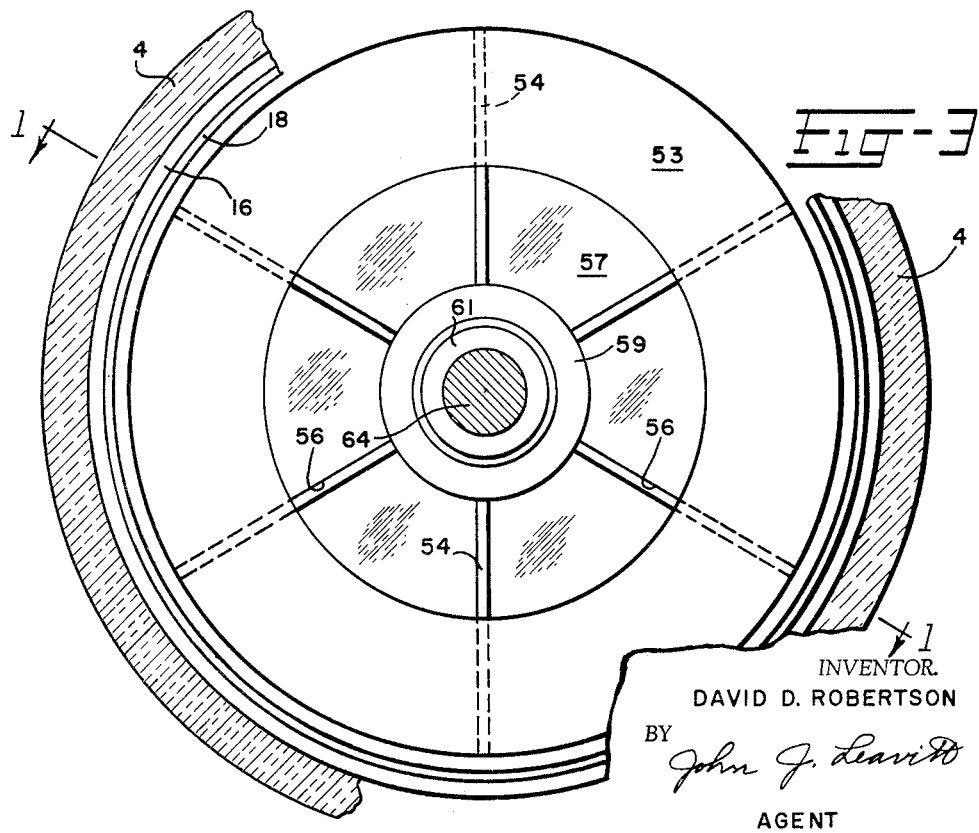
INVENTOR.
DAVID D. ROBERTSON
BY John J. Leavitt
AGENT

United States Patent Office 3,213,340
Patented Oct. 19, 1965

3,213,340
MOTOR DRIVEN HERMETICALLY SEALED
VARIABLE CAPACITOR
David D. Robertson, San Jose, Calif., assignor to Jennings Radio Manufacturing Corporation, San Jose, Calif., a corporation of Delaware
Filed Oct. 3, 1962, Ser. No. 228,111
12 Claims. (Cl. 317—248)

This invention relates to variable capacitors, and particularly to a variable motor driven hermetically sealed capacitor.

Various arrangements have been devised for effecting axial translation of the movable electrode in a hermetically sealed variable capacitor. Most of these arrangements incorporate a bellows functioning both as an expansible wall of the envelope containing the electrodes and as an hermetic seal isolating the translation mechanism from the interior of the envelope. It has been considered by those skilled in the art that it was necessary to have the translation mechanism in the atmosphere because of the tendency of relatively movable parts contained within a vacuum to seize to each other, and the inability to lubricate parts hermetically sealed within an envelope. It is therefore one of the objects of the present invention to provide a variable capacitor incorporating a translation mechanism hermetically sealed within the envelope.

In the past, commercially available variable capacitors have almost exclusively incorporated glass in their envelope, and have thus been limited in the bake-out temperatures utilized to out-gas metallic parts within the envelope. It has been found that the use of ceramic materials, such as aluminum oxide, permit bake-out temperatures to be increased considerably, thus effecting a more complete out-gassing of structure within the envelope, and in a vacuum device for instance preventing gradual deterioration of the vacuum within the envelope. It is therefore another object of the present invention to provide a motor driven capacitor utilizing high temperature ceramic in its envelope construction.

It is desirable in fabricating electronic and electrical components incorporating ceramic parts to subject the ceramic parts of the structure to as few temperature cycles as is practicable. It has been found that excessive heat cycling of ceramic is conducive to failure of the ceramic, particularly when the ceramic is hermetically joined to a metal part and the union is subjected to heat cycling. It is therefore a still further object of the present invention to provide a motor driven variable capacitor in which subassemblies of the structure are pre-fabricated and then sealed within the envelope in a manner to subject the ceramic envelope portions to only a single major heating cycle.

It is well known that the electrical capacity of a device of the character described is proportional to the area of the opposed plates and the spacing therebetween. Thus, to increasce the capacitance of a capacitor it has been found that concentrically disposed plates arranged to intermesh upon axial displacement of one of the sets of concentric plates, in conjunction with close spacing of the plates provides a desired amount of capacitance in a relatively small space. The close spacing of the plates however creates the problem of shortening between plates if excessive vibration of the plates is permitted. It is accordingly another object of the present invention to provide a variable capacitor in which both sets of condenser plates are rigidly mounted to prevent excessive vibration, while permitting axial translation of one of the sets of condenser plates to effect variable intermeshing of the condenser plates.

Contrary to general belief, we have discovered that it is possible to have relatively movable contacting parts enclosed within a vacuum envelope without subjecting the parts to excessive friction caused by seizing. It is accordingly another object of the invention to provide a rotatable shaft within the evacuated envelope in conjunction with means on the shaft to effect axial translation of the movable capacitor electrode upon rotation of the shaft.

Vacuum variable capacitors have heretofore utilized a metallic bellow both as an expansible vacuum-tight wall of the envelope and as a current carrying conductor through which the capacitor is charged or discharged. It has been found that the use of a bellow in this manner forms a weak link in the construction of a vacuum variable capacitor. It is therefore a still further object of the present invention to utilize an expansible bellow not as a vacuum wall but as a current carrying member to provide a conductive path capable of carrying a large amount of current, as an RF shield, and as an anti-rotary thrust device.

It is essential in a capacitor that one electrode be electrically insulated from the opposing electrode. It is also desirable that these electrodes be thermally insulated from each other, and that both of the electrodes be electrically and thermally insulated from the axial translation mechanism. It is accordingly another object of the invention to provide a variable capacitor in which the opposing sets of electrodes are electrically and thermally insulated from each other and from the translation mechanism utilized to effect axial displacement of the mobile electrode.

Another object of the invention is the provision of a motor driven variable capacitor designed to withstand vibration up to at least 10 G's at 550 cycles per second.

Still another object of the present invention is to provide a ceramic-to-metal seal configuration designed to compensate for differences in thermal expansion and contraction between adjacent metal and ceramic parts.

The invention possesses other objects and features of advantage, some of which, with the foregoing will be apparent from the following description and the drawings. It is to be understood however that the invention is not limited by the said description or the drawings, but may be embodied in various forms within the scope of the appended claims.

Broadly consider, the motor driven variable capacitor of the invention comprises a pair of oppositely disposed end cap assemblies arranged in axially spaced relation and hermetically bonded to an intervening dielectric envelope portion preferably fabricated from ceramic. One of the end cap assemblies includes a set of concentrically arranged condenser plates fixed directly to the end cap. The other end cap assembly includes the mobile capacitor electrode or condenser plate assembly, which is electrically connected to the end cap by an expansible metallic bellow. Mounted on the mobile set of condenser plates is a thrust member operatively disposed on a rotatable shaft journaled at each end on suitable bearings mounted on the opposite end cap assemblies. A supporting shell is disposed between one of the bearings and the associated end cap, and a suitable motor is rigidly mounted on this end cap so as to appropriately engage the rotatable shaft. Operation of the motor effects selective rotation of the shaft, which is trapped against axial displacement, with the result that the thrust member and the movable set of condenser plates are moved axially along the shaft. Means are provided on each end cap assembly to connect the capacitor into a circuit.

Referring to the drawings:

FIG. 2 is a plan view of a portion of one of the end cap assemblies taken in the direction of the arrows on line 2—2 in FIG. 1.

FIG. 3 is a horizontal sectional view taken in the plane indicated by the line 3—3 in FIG. 1.

Figure 1:
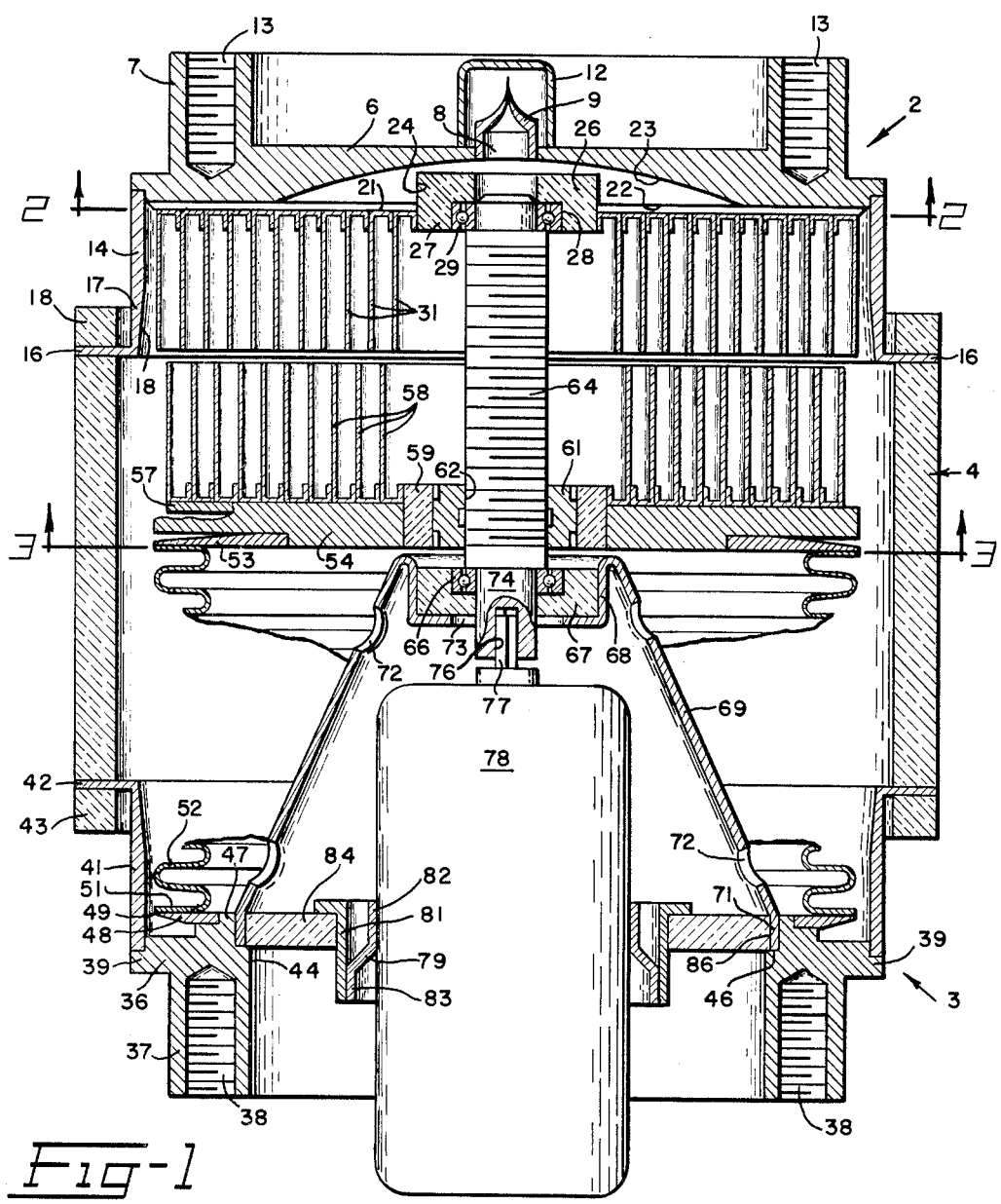
FIG. 1 is a vertical cross-sectional view taken in the plane indicated by the line 1—1 in FIG. 3. Portions of the structure are shown in elevation.

In terms of greater detail, the motor driven variable capacitor of the invention comprises a first end cap assembly designated generally by numeral 2, a second end cap assembly designated generally by numeral 3, and an intervening dielectric envelope portion 4 preferably of ceramic, hermetically disposed between end cap assemblies 2 and 3.

The end cap assembly 2 includes a heavy plate portion 6 having an outwardly extending annular mounting and strengthening flange 7 formed adjacent its outer periphery, and is centrally apertured as at 8 to receive a metallic tubulation 9 useful to evacuate the envelope or charge the envelope with a suitable gas. After evacuation or charging of the envelope tubulation 9 is pinched as shown and protected by cap 12 brazed to plate 6. The annular flange 7 constitutes a mounting flange for the capacitor and includes a plurality of tapped bores 13 adapted to receive appropriate mounting screws (not shown).

Hermetically heliarc welded about an outer peripheral portion of plate 6 is a cylindrical flange 14 extending in a direction opposite to flange 7 and provided at its end remote from plate 6 with a radially extending relatively thinner flange 16 hermetically bonded as by brazing to the adjacent metallized end surface of ceramic envelope portion 4. As shown in the drawing, cylindrical flange 14 is slightly smaller in diameter than tubular ceramic portion 4, and meets flange 16 at substantially a right angle.

In order to accommodate differences in thermal expansion and contraction between ceramic member 4 and metallic flange 14, the flange 14 is provided with a thinned-down portion 17 adjacent flange 16, formed by providing a tapered surface 18 on the interior of flange 14. Thus, since metal flange 14 will expand and contract to a greater extent than ceramic envelope portion 4, the thinned-down portion 17 of the flange compensates through flexure for shear stresses which would otherwise be imposed directly on the hermetic union. The thickness of flange 16 is selected to permit the ceramic member to dominate this portion of the structure. Such domination of flange 16 by the ceramic is aided by bonding a backing ring 18 to the surface of flange 16 opposite the ceramic envelope portion 4.

As shown best in FIG. 2, the inner surface 21 of plate 6 is provided with a plurality of radially extending grooves 22 adapted to facilitate the evacuation or charging of the envelope and prevent trapping of chemical cleansing agents within the envelope. Each of grooves 22 includes a portion 23 which deepens progressively toward the center of the plate and communicates with tubulation 9. Centrally disposed in plate 6 is a recess 24 adapted to accommodate an annular ceramic bushing 26. The ceramic bushing possesses a thickness such that a part thereof extends beyond surface 21 of plate 6 in a portion 27 having a rabbett 28 on its inner periphery within which is seated a ball bearing assembly 29, preferably of a type to carry both axial and radial thrust.

Inasmuch as the ball bearing assembly includes parts which must move relative to each other, and since these parts are contained within the envelope which may be evacuated, it has been found that seizing of the parts can be prevented for instance by silver plating the relatively movable parts or by utilization of a suitable dry lubricating material such as molybdenum disulfide and graphite in a sodium silicate binder. Brazed to inner surface 21 of end plate 6 is a set of condenser plates comprising a plurality of cylindrical concentrically arranged thin metallic plates 31. The end of each plate 31 adjacent plate 6 is provided with a radially extending and re-entrant flange construction which functions to rigidly bind adjacent plates to one another and to end plate 6.

The end cap assembly 3 is designated the mobile end cap for convenience of reference, and includes an annular strengthening flange 37 on its inner periphery which also functions as a mounting ring at this end of the device. As with flange 7, the flange 37 is also provided with appropriate tapped bores 38 adapted to accommodate suitable mounting screws. The outer peripheral edge of plate 36 is rabbetted to provide a relatively thin radially extending flanged portion 39 adapted to be heliarc welded to one end of an axially extending cylindrical flange 41, the other end of the cylindrical flange being provided with a radially extending flange 42 hermetically joined to the associated metalized end surface of ceramic envelope portion 4. Flange 41 possesses a configuration similar to flange 14 for purposes of compensation of thermal expansion and contraction in the manner previously discussed. A backing member 43 serves to strengthen the union between flange 42 and ceramic member 4.

As shown in FIG. 1, the inner periphery 44 of annular plate 36 is rabbetted to provide a shoulder 46 and cylindrically extending flange 47, the latter functioning as a centering guide for annular heliarc ring 48, the inner periphery of which snugly surrounds flange 47. The heliarc ring is brazed to the adjacent surface of plate 36. The outer peripheral portion of heliarc ring 48 is tapered as shown to provide a thin outer peripheral edge 49 adapted to be heliarc welded to the associated edge of flange 51 of metallic bellow 52. It is not required that the union between the flange 51 and heliarc flange 48 be of a hermetic nature, but it is important for purposes of conduction of electricity through the union that it be integral.

The other end of the bellow 52 is heliarc welded in the same manner to a heliarc ring 53, the inner peripheral portion of which is seated and brazed in suitable notches formed in radially extending ribs 54, sandwiched between adjacent lateral edges 56 of a plurality of gusset plates 57 brazed to the flanged ends of mobile condenser plates 58. The gusset plates 57 and ribs 54 serve as a warp-resistant strengthening and rigidifying structure to provide support for the movable set of condenser plates. Plate 57 and ribs 54 also function as a heat sink to draw heat from the condenser plates and conduct it out to the large diameter bellow for conduction to the associated end cap. These elements perform this function without adding an undesirable amount of weight to the assembly. Inasmuch as these units are often used in airborne equipment, it is desirable that weight be maintained at a minimum.

It will thus be seen that current flowing from condenser plates 58 passes radially through gusset plates 57 and ribs 54 into the radially extending heliarc ring 53 and thence through bellows 52 to end plate 36. The inner peripheral edges of gusset plates 57 and ribs 54 coincide and abut against the outer peripheral surface of ceramic bushing 59, being brazed thereto as is the inner periphery of the innermost cylindrical condenser plate 58.

Fixed within the dielectric bushing 59 is an annular thrust member 61, the inner periphery 62 of which is provided with suitable means, such as threads or a reciprocating ball arrangement, operatively engaging complementary means on the outer periphery of axially extending and rotatable shaft 64. The shaft illustrated is metallic but a dielectric shaft could be substituted and would serve to eliminate several dielectric insulators such as 26, 59, and 67. At its end adjacent plate 6, the shaft 64 is journaled by a ball-bearing assembly 29. At its other end the shaft is journaled on ball-bearing assembly 66, suitably supported by ceramic bushing 67, disposed within a cup-shaped re-entrant portion 68 formed on the inner end of metallic support shell 69. The support shell is conveniently conical in longitudinal cross-section as shown in FIG. 1, and is provided at its end remote from the re-entrant cup-shaped portion with a cylindrical flange portion 71 seated on shoulder 46. The conical shell is provided with apertures 72 connecting the space within the shell with the space outside the shell.

It will be seen from FIG. 1 that the re-entrant shell portion 68 is provided with a central aperture 73 through which a reduced diameter portion 74 of shaft 64 extends into the interior of shell 69, the end of the reduced diameter portion 74 being provided with a broached bore 76 adapted to receive a drive shaft 77 extending from motor 78.

The motor 78 is provided with a hermetically tight housing, a portion of which forms a portion of the wall of the hermetically sealed envelope. The motor is rigidly mounted on end plate 36 by a pair of sealing rings 79 and 81 circumscribing the outer periphery of the motor. The flange 79 is provided with a portion 82 hermetically brazed to the motor housing and a cylindrical seal flange 83 radially spaced away from the housing. The sealing ring 81 fits snugly about the cylindrical seal flange 83 and within the inner periphery of annular ceramic plate 84, the outer peripheral edge 86 of which is appropriately metalized and brazed to plate 36 and support shell flange 71 seated on shoulder 46. The inner periphery of ceramic plate 84 is hermetically brazed about the outer cylindrical periphery of sealing ring 81 adjacent one end thereof. As shown in FIG. 1, sealing rings 79 and 81 are arranged to provide juxtaposed edges adapted to be heli-arc welded to provided an integral and hermetic union between the two rings.

In operation, the shaft 64 is trapped against axial displacement but is capable of rotation with motor 78, which is of the reversing type. Energizing the motor to rotate the shaft effects axial translation of the thrust member on the shaft, thus carrying the mobile electrode into or out of intermeshing relation with the fixed electrode. Torque imposed on the mobile set of condenser plates by the tendency of the thrust member to rotate is absorbed by the bellows, which prevents rotation of the mobile set of condenser plates. Such torque is maintained at a minimum by the nature of the relatively movable union between the shaft and thrust member, which may conveniently include an overrunning feature to permit overrunning of the motor when the mobile electrode reaches either extremity of its excursion. A suitable reciprocating ball structure is illustrated in U.S. Patent 3,053,105. It will of course be understood that different types of translation or thrust members may be used to advantage.

I claim:
1. A motor driven capacitor comprising:
    (a) an hermetically sealed envelope including
        (1) a tubular dielectric portion and
        (2) metallic end caps closing opposite ends of the tubular dielectric portion,
    (b) a set of concentrically arranged fixed condenser plates fixed to one of the end caps,
    (c) a set of concentrically arranged mobile condenser plates connected to the other end cap,
    (d) means within the envelope operative to effect axial displacement of the mobile condenser plates and including
        (1) a shaft having opposite ends journaled for rotation on opposite end caps and held captive against axial displacement, and
        (2) thrust means operatively interposed between the shaft and mobile condenser plates to effect axial displacement of the mobile plates when the shaft is turned, and
    (e) remotely controllable reversing motor means mounted on one of the end caps and operatively connected to said shaft to effect selective rotation of the shaft.

2. The combination according to claim 1, in which each said end cap includes a cylindrical metallic flange extending toward said dielectric portion and a radially extending flange on the cylindrical flange hermetically united to the adjacent end of said tubular dielectric portion.

3. The combination according to claim 1, in which said motor means includes a housing forming a part of the envelope wall.

4. The combination according to claim 1, in which electrically conductive expansible bellow means connect the outer peripheral partion of said mobile set of condenser plates and said other end cap.

5. The combination according to claim 1, in which means are interposed between said end caps and the means to effect axial displacement of the mobile condenser plates to electrically insulate the sets of consenser plates and said end caps from the means for effecting axial displacement.

6. The combination according to claim 1, in which a metallic support shell is interposed between said other end cap and said shaft to retain said shaft against vibration.

7. The combination according to claim 2, in which the cylindrical flange is tapered for a portion of its length next adjacent the radially extending flange.

8. In a variable capacitor, a mobile electrode comprising a composite base structure including a plurality of radially extending beam members and gusset plates extending between the beam members and brazed thereto, and a plurality of concentrically arranged condenser plates brazed to said beam members and gusset plates.

9. The subcombination according to claim 8, in which said mobile electrode is annular, means to effect axial displacement are mounted within the inner periphery of the electrode, and electrically conductive means are fixed to the outer priphery of said electrode to connect the electrode into a curcuit.

10. In a variable capacitor having an hermetically sealed envelope and a mobile electrode within the envelope, an end cap assembly comprising an annular metallic end plate, an annular dielectric plate hermetically united with the inner periphery of the end plate, a reversing motor mounted on the annular dielectric plate and electrically insulated from the end palte and including a rotatable drive shaft extending into the envelope, and means operatively interposed between the drive shaft and mobile electrode to effect axial displacement of the electrode upon rotation of the drive shaft.

11. The combination according to claim 10, in which an electrically conductive expansible bellow is interposed between the mobile electrode and said annular metallic end plate.

12. The combination according to claim 10, in which a metallic support shell is rigidly interposed between the annular metallic end plate and the means to effect axial displacement of the electrode.

References Cited by the Examiner

UNITED STATES PATENTS

| | | | |
|---|---|---|---|
| 1,552,185 | 9/25 | Alcox | 317—253 |
| 1,625,330 | 4/27 | Pinkus | 317—251 |

(Other references on following page)

UNITED STATES PATENTS

| | | | |
|---|---|---|---|
| 2,439,255 | 4/48 | Longfellow | 317—253 |
| 2,454,049 | 11/48 | Floyd | 317—244 |
| 2,511,338 | 6/50 | Jennings | 317—245 |
| 2,556,846 | 6/51 | Longacre | 317—251 |
| 2,883,593 | 4/59 | Jennings | 317—245 |
| 2,913,644 | 11/59 | Bleazy | 317—249 |
| 2,920,255 | 1/60 | Luft | 317—251 |
| 2,956,844 | 10/60 | Wright | 317—253 |
| 3,086,157 | 4/63 | Branco | 317—250 |

FOREIGN PATENTS 643,650  9/50  Great Britain.

JOHN F. BURNS, *Primary Examiner.*